(12) United States Patent
McNestry

(10) Patent No.: US 10,883,622 B2
(45) Date of Patent: Jan. 5, 2021

(54) ELECTRICALLY OPERATED FLUID FLOW VALVE ARRANGEMENTS

(71) Applicant: Martin McNestry, Heanor (GB)

(72) Inventor: Martin McNestry, Heanor (GB)

(73) Assignee: Martin McNestry, Heanor (GB)

( * ) Notice: Subject to any disclaimer, the term of this patent is extended or adjusted under 35 U.S.C. 154(b) by 0 days.

(21) Appl. No.: 15/528,684

(22) PCT Filed: Nov. 26, 2015

(86) PCT No.: PCT/GB2015/053616
§ 371 (c)(1),
(2) Date: May 22, 2017

(87) PCT Pub. No.: WO2016/083821
PCT Pub. Date: Jun. 2, 2016

(65) Prior Publication Data
US 2017/0268690 A1  Sep. 21, 2017

(30) Foreign Application Priority Data
Nov. 26, 2014  (GB) .................................. 1421022.3

(51) Int. Cl.
*F16K 31/08* (2006.01)
*F16K 5/04* (2006.01)
*H01F 7/20* (2006.01)

(52) U.S. Cl.
CPC .......... *F16K 31/082* (2013.01); *F16K 5/0442* (2013.01); *H01F 7/206* (2013.01)

(58) Field of Classification Search
USPC ....................... 251/65, 67–70, 101, 112, 111
See application file for complete search history.

(56) References Cited

U.S. PATENT DOCUMENTS 2,407,184 A * 9/1946 Sparrow ............ G05D 23/1925
123/41.06
2,579,723 A * 12/1951 Best ...................... H01F 7/1615
251/129.1

(Continued)

FOREIGN PATENT DOCUMENTS

| EP | 1959178 A2 | 8/2008 |
|---|---|---|
| GB | 1008888 | 11/1965 |
| WO | 0020785 A1 | 4/2000 |

*Primary Examiner* — Daphne M Barry
(74) *Attorney, Agent, or Firm* — Iandiorio Teska & Coleman, LLP

(57) ABSTRACT

An electrically operated fluid flow valve arrangement (50) includes an electrically powered magnetic field generator (42), a valve body (44) defining a valve chamber (7), an inlet port (5), an outlet port (20) and a valve member (18) located in the chamber (7). The valve member (18) is movable between closed and open conditions relative to one of the ports (5, 20). The valve member (18) includes a permanent magnet (9). The arrangement (50) includes a switchable pole 46 formed of a ferromagnetic material. In use, in a first latched condition, the valve member (18) is retained by the switchable pole (46) in one of the closed or open conditions and, in a second latched condition, in the other of the closed or open conditions, the valve member (18) being moved from one latched condition to the other by operation of the generator (42).

13 Claims, 12 Drawing Sheets

(56) References Cited

U.S. PATENT DOCUMENTS

| | | | | |
|---|---|---|---|---|
| 2,886,063 A * | 5/1959 | Ray | F16K 31/0606 137/625.27 |
| 3,476,355 A * | 11/1969 | Sherwood | F16K 31/0682 251/65 |
| 3,784,943 A * | 1/1974 | Markowitz | H01F 7/08 335/266 |
| 3,977,436 A * | 8/1976 | Larner | F16K 31/082 137/625.65 |
| 4,071,042 A * | 1/1978 | Lombard | H01F 7/13 137/116.3 |
| 4,512,549 A * | 4/1985 | Gast | F16K 31/082 251/129.1 |
| 4,538,129 A * | 8/1985 | Fisher | F16K 31/082 137/625.65 |
| 4,564,046 A * | 1/1986 | Lungu | F16K 31/082 137/625.65 |
| 4,690,371 A * | 9/1987 | Bosley | F16K 31/082 251/129.01 |
| 4,794,947 A * | 1/1989 | Kuramochi | G01F 1/68 137/486 |
| 4,831,973 A * | 5/1989 | Richeson, Jr. | F01L 9/04 123/90.11 |
| 5,213,307 A * | 5/1993 | Perrillat-Amede | F16K 31/088 251/65 |
| 5,300,908 A * | 4/1994 | Stone | H01F 7/088 335/236 |
| 5,405,050 A * | 4/1995 | Walsh | B67D 3/043 222/1 |
| 7,252,114 B2 * | 8/2007 | Wygnanski | F16K 31/0682 137/625.44 |
| 7,288,085 B2 * | 10/2007 | Olsen | A61M 5/14216 604/151 |
| 7,896,018 B2 * | 3/2011 | Erickson | A61M 5/14216 137/1 |
| 9,318,247 B2 * | 4/2016 | Schiepp | H01F 7/121 |
| 9,320,882 B2 * | 4/2016 | McDaniel | F16K 27/0227 |
| 2003/0159454 A1 | 8/2003 | Ott et al. | |
| 2008/0179553 A1 * | 7/2008 | Walter | F16K 31/0682 251/65 |

\* cited by examiner

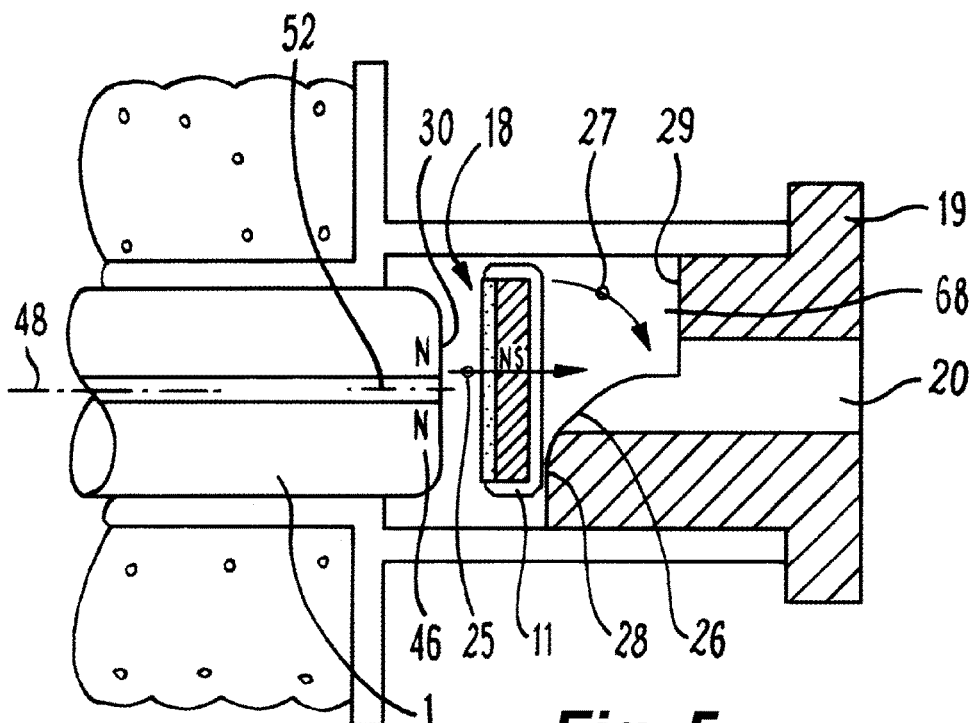
*Fig. 5*
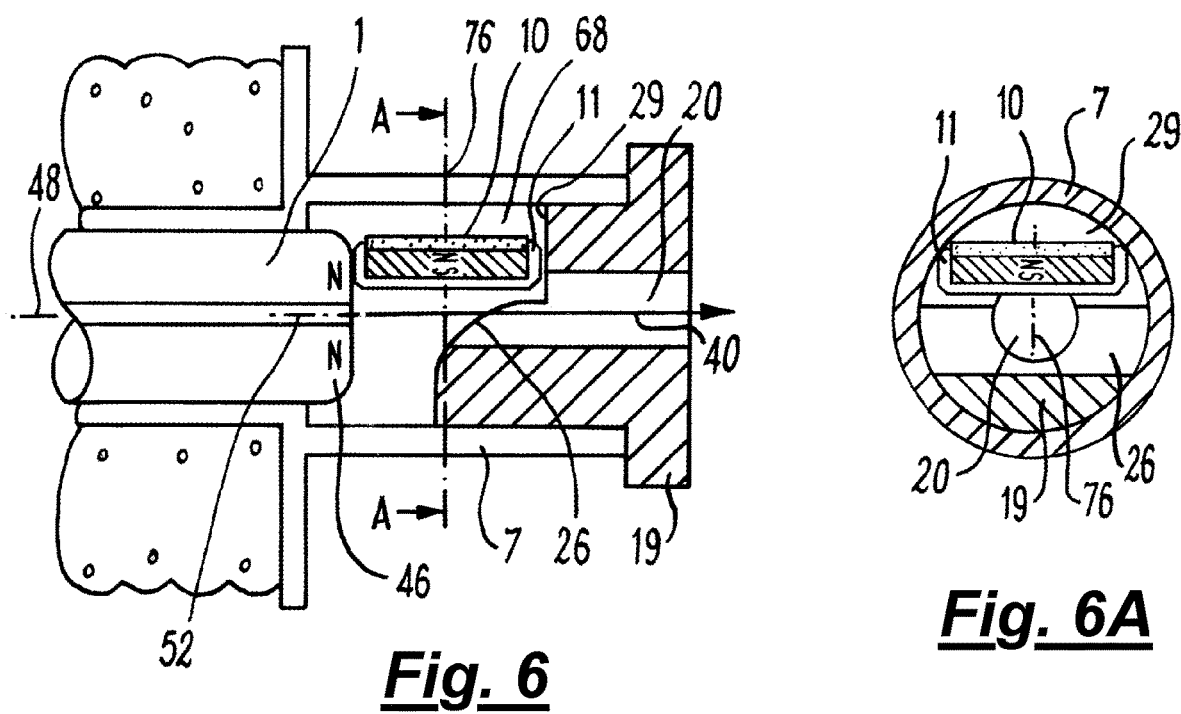
*Fig. 6*
*Fig. 6A*

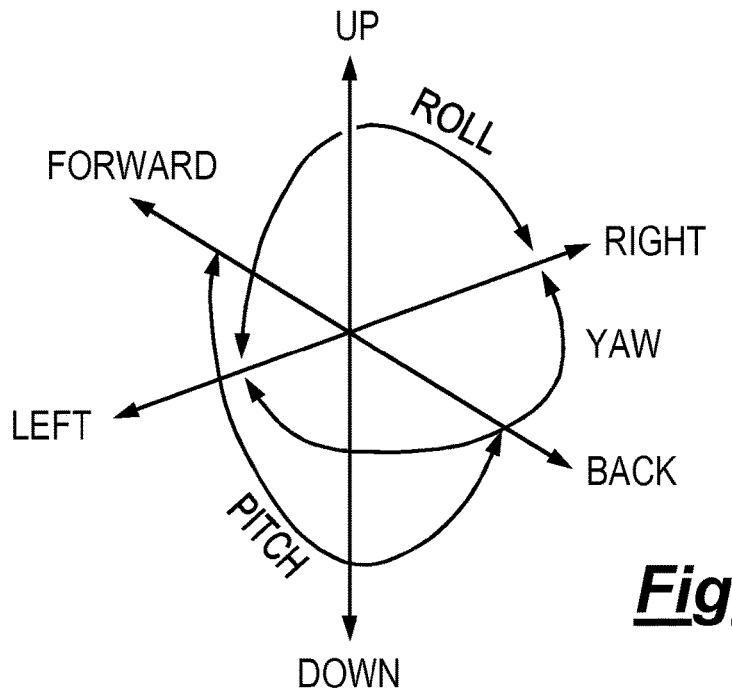
*Fig. 12*

*Fig. 13B*
*Fig. 13C* 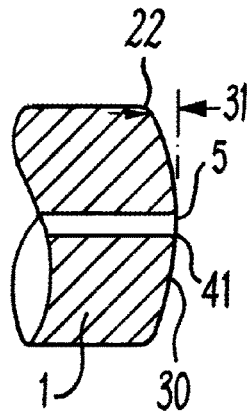 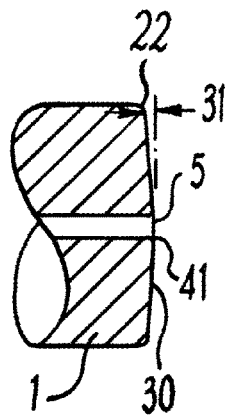

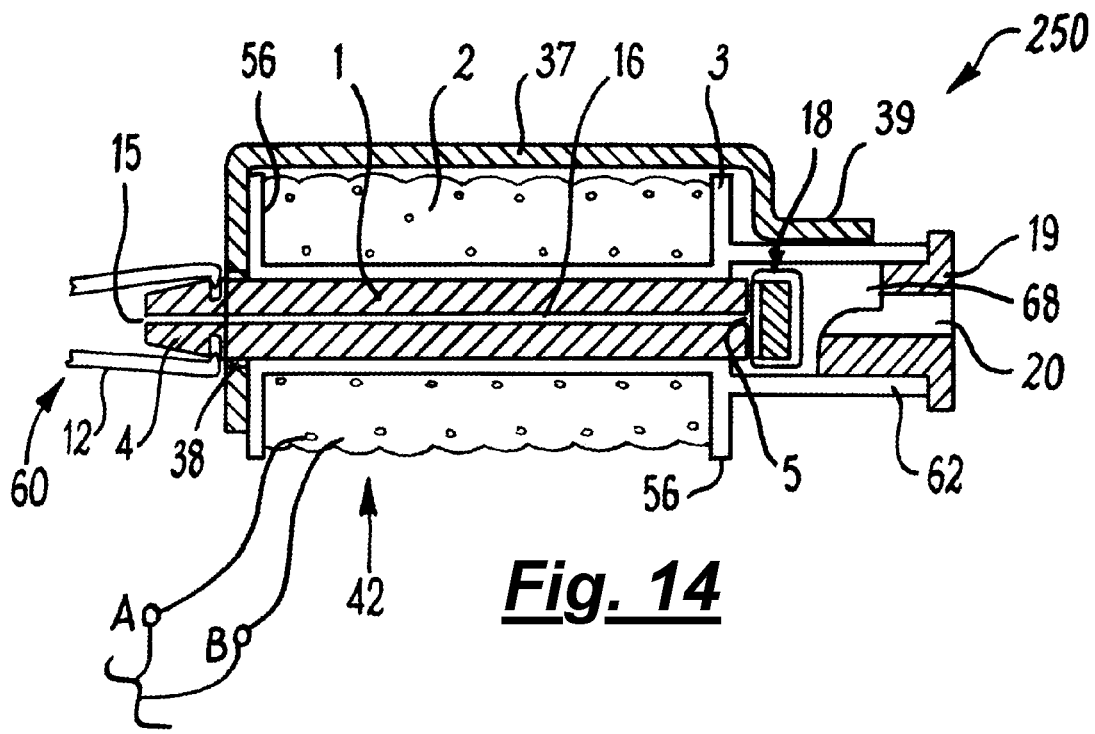
Fig. 14
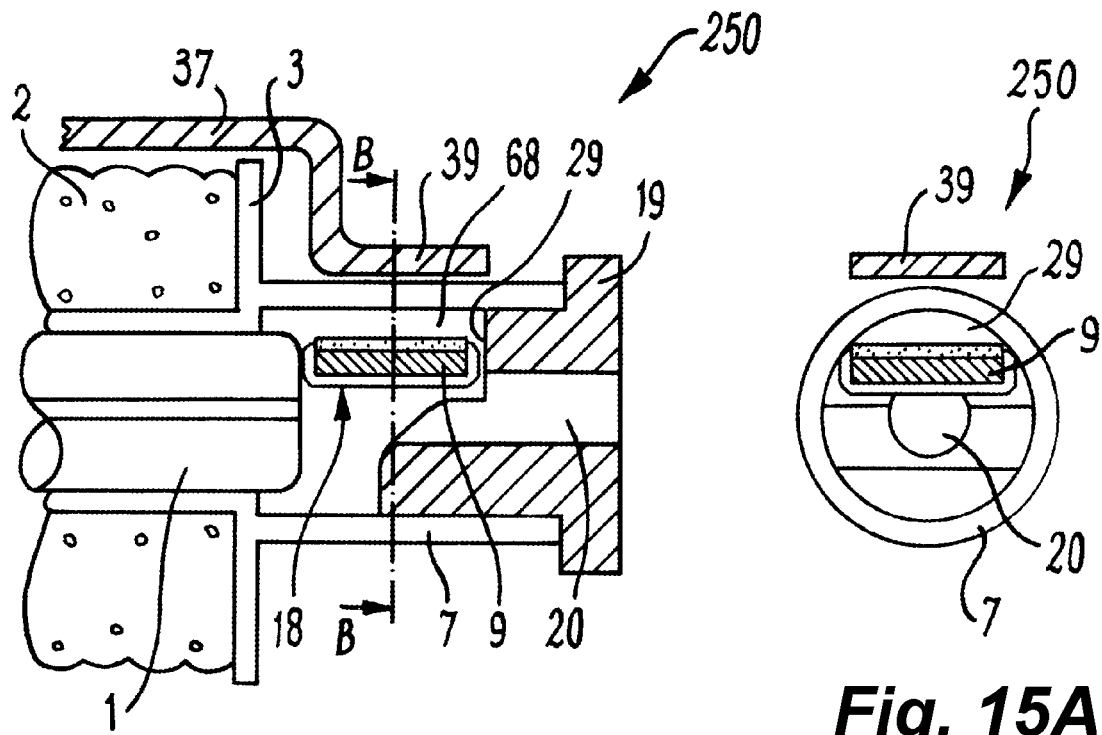
Fig. 15  Fig. 15A

ELECTRICALLY OPERATED FLUID FLOW VALVE ARRANGEMENTS

ELECTRICALLY OPERATED FLUID FLOW VALVE ARRANGEMENTS

The present invention relates to electrically operated fluid flow valve arrangements.

Conventionally, solenoid valves comprise a movable ferromagnetic member in the form, for example, of a pin within a flow chamber which is moved in one direction to one condition by electrically activating a solenoid coil and then moved in an opposite direction to another condition under fluid pressure or spring pressure with the solenoid coil deactivated. One disadvantage of this arrangement is that the electrical activation must be maintained to keep the pin in the one condition. Such arrangements are then unsuitable for low energy applications, such as battery operated plant watering systems.

Many traditional solenoid valves operate in one predetermined fluid flow direction or depend on fluid pressure in one direction for correct operation, and so cannot tolerate low fluid pressure, negative fluid pressure, or reverse fluid flow.

In this specification, the term "ferromagnetic material" is used to mean a material which is like iron, in that it can be temporarily magnetised by an external magnetic field, and is relatively strongly attracted to a magnet, for example, iron, nickel, cobalt or alloys thereof.

According to a first aspect of the present invention, there is provided an electrically operated fluid flow valve arrangement, the arrangement including:
an electrically powered magnetic field generator;
a valve body defining a valve chamber, an inlet port and an outlet port;
a valve member located in the valve chamber and movable between a closed condition in which the valve member locates against one of the ports to prevent fluid flow through said one of the ports and an open condition in which the valve member permits fluid flow through said one of the ports; and
a ferromagnetic member having a first switchable pole;
and the arrangement being such that:
the valve member includes a permanent magnet;
the first switchable pole is formed of a ferromagnetic material;
the ferromagnetic member defines a passage which communicates with the valve chamber via one of the ports;
in use, in a first latched condition, the valve member is retained by magnetic attraction to the first switchable pole in one of the closed or open conditions;
in use, in a second latched condition, the valve member is retained by magnetic attraction to the first switchable pole in the other of the closed or open conditions;
in the first and second latched conditions the generator is in en unpowered condition; and
the valve member is movable from one latched condition to the other operation of the generator.

Possibly, the movement of the valve member between the open and the closed conditions includes rotational movement. Possibly, the rotational movement is arranged so that, after the rotational movement, the valve member faces in a different direction.

Possibly, the arrangement includes an axis associated with the one port. Possibly, the rotational movement is around an axis which is not aligned with or parallel to the axis associated with the one port.

Possibly, the movement of the valve member between the open and the closed conditions includes substantially linear movement.

Possibly, the linear movement is substantially along a direction aligned with or parallel to the axis associated with the one port. Possibly, the movement includes both the rotational and the linear movement.

Possibly, the valve member is free of any mechanical connection to the valve body.

Possibly, the operation of the generator reverses the polarity of the switchable pole. Possibly, the change of polarity of the switchable pole causes the valve member to move between the closed and open conditions.

Possibly, the generator is movable between an unpowered condition in which no magnetic field is generated, a first operating condition in which the generator generates a magnetic field in a first direction and a second operating condition in which the generator generates a magnetic field in a second, opposite direction.

Possibly, in the latched conditions, the generator is in the unpowered condition.

Possibly, to initiate movement of the valve member between the latched conditions, the generator is moved to either the first operating condition or the second operating condition. Possibly, following initiation of the movement, or when the valve member has reached the new latched condition, the generator is moved to the unpowered condition.

Possibly, the arrangement includes a ferromagnetic member, which may comprise the switchable pole. Possibly, the ferromagnetic member defines a passage. Possibly the passage communicates with the chamber via the one of the ports. Possibly, the ferromagnetic member defines the one of the ports.

Possibly, the passage is substantially straight and may be substantially cylindrical. Possibly, the passage has a longitudinal axis, which may be the axis associated with the one port. Possibly, the one of the ports has an axis, which may be the axis associated with the one port, and which may be substantially aligned with the passage axis.

Possibly, the generator comprises a coil, which may be located around the ferromagnetic member.

Possibly, the ferromagnetic member is fixed in position relative to the coil.

Possibly, the ferromagnetic member comprises a connector, which may permit connection to a corresponding connector of a fluid communication arrangement.

Possibly, the valve body includes a guide surface for guiding the movement of the valve member between the closed condition and the open condition. Possibly, the guide surface defines one of the ports. Possibly, the guide surface includes a convex part. Possibly, the guide surface, with the valve body, defines a valve member receiving recess, in which the valve member is receivable in the open condition.

Possibly, the valve member includes a seal, which may be formed of a resiliently deformable material. Possibly, in the closed condition, the seal extends across one of the ports.

Possibly, the valve member is in the form of a disc. The seal may form a flat surface of the disc, and may form a flat face of the disc.

Possibly, the valve member has an axis, which in the closed condition, is substantially aligned with or is substantially parallel to the axis of the one port.

Possibly, the valve member has an axis which, in the open condition, is not substantially aligned with or substantially parallel to the axis of the one port. Possibly, the valve member axis in the open condition is at an angle of between 45° and 120° to the axis of the one port, and may be at substantially 90° to the axis of the one port.

Possibly, in moving between the open condition and the closed condition, the valve member rotates through substantially 180°.

Possibly, the valve member defines one or more bypass flow channels, which in the open condition permit fluid flow there through.

Possibly, the arrangement includes a second switchable pole, which assists movement of the valve member between the latched conditions and retention of the valve member in the respective latched condition. Possibly, the second switchable pole is of opposite polarity to the first switchable pole.

Possibly, the arrangement includes a second ferromagnetic member which may extend from the ferromagnetic member. Possibly the second ferromagnetic member includes the second switchable pole.

Possibly, in the closed condition, the valve member locates against the inlet port. Possibly, in the closed condition, the magnetic force between the valve member and the switchable pole retains the valve member against the inlet port.

Possibly, the arrangement includes an electrical power supply for providing electrical power to the generator. Possibly the power supply comprises a power store, which may comprise one or more batteries.

Possibly, the arrangement includes a power supply monitor. Possibly the arrangement includes a power supply status indicator.

Possibly, the power supply status indicator comprises an oscillator, so that the generator generates an oscillating magnetic field in one, each or either operating condition. Possibly, in a status indication condition, the oscillator causes audible vibration of the valve member relative to the switchable pole.

Possibly, the arrangement is for a low energy device, and may be for a watering device.

According to a second aspect of the present invention, there is provided plant watering apparatus, the apparatus including an electrically operated fluid flow valve arrangement, the arrangement including an electrically powered magnetic field generator, a valve body defining a valve chamber, an inlet port and an outlet port, a valve member located in the chamber and movable between a closed condition in which the valve member locates against one of the ports to substantially prevent fluid flow therethrough and an open condition in which the valve member permits fluid flow through the one port, the valve member including a permanent magnet, the arrangement including a switchable pole formed of a ferromagnetic material, wherein, in use, in a first latched condition, the valve member is retained by the switchable pole in one of the closed or open conditions and in a second latched condition, the valve member is in the other of the closed or open conditions, the valve member being moved from one latched condition to the other by operation of the generator.

According to a third aspect of the present invention, there is provided a method of controlling fluid flow, the method including providing an electrically operated fluid flow valve arrangement, the arrangement including an electrically powered magnetic field generator, a valve body defining a valve chamber, an inlet port and an outlet port, a valve member located in the chamber and movable between a closed condition in which the valve member locates against one of the ports to substantially prevent fluid flow therethrough and an open condition in which the valve member permits fluid flow through the one port, the valve member including a permanent magnet, the arrangement including a switchable pole formed of a ferromagnetic material, wherein, in use, in a first latched condition, the valve member is retained by the switchable pole in one of the closed or open conditions and in a second latched condition, the valve member is in the other of the closed or open conditions, the valve member being moved from one latched condition to the other by operation of the generator.

Possibly, the arrangement includes any of the features described in any of the preceding statements or following description. Possibly, the method includes any of the steps described in any of the preceding statements or following description.

Embodiments of the present invention will now be described, by way of example only, and with reference to the accompanying drawings, in which:

FIG. 5 is a side cross-sectional view of the part of the first valve arrangement shown in FIG. 4 in transition from the closed to an open condition;

FIG. 6 is a side cross-sectional view of the part of the first valve arrangement shown in FIGS. 4 and 5 in the open condition.

FIG. 6A is a cross-sectional view on arrows A-A in FIG. 6;

FIG. 12 is a diagram of the six degrees of freedom of movement of a body in space, showing three orthogonal linear movements and three rotational movements;

Figure 13A:
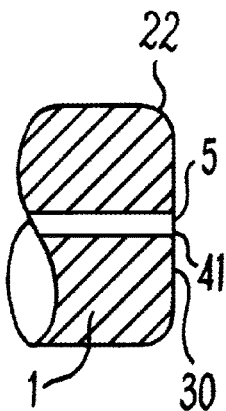
Figure 16:
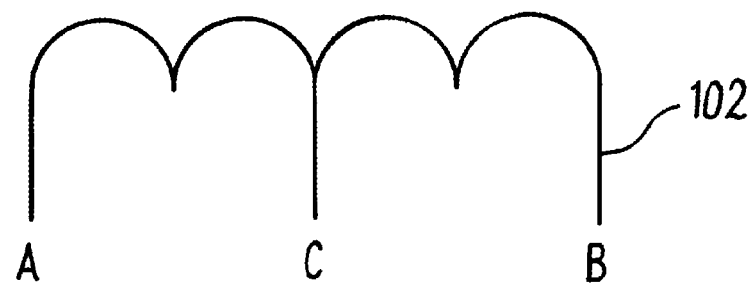
Figure 17:
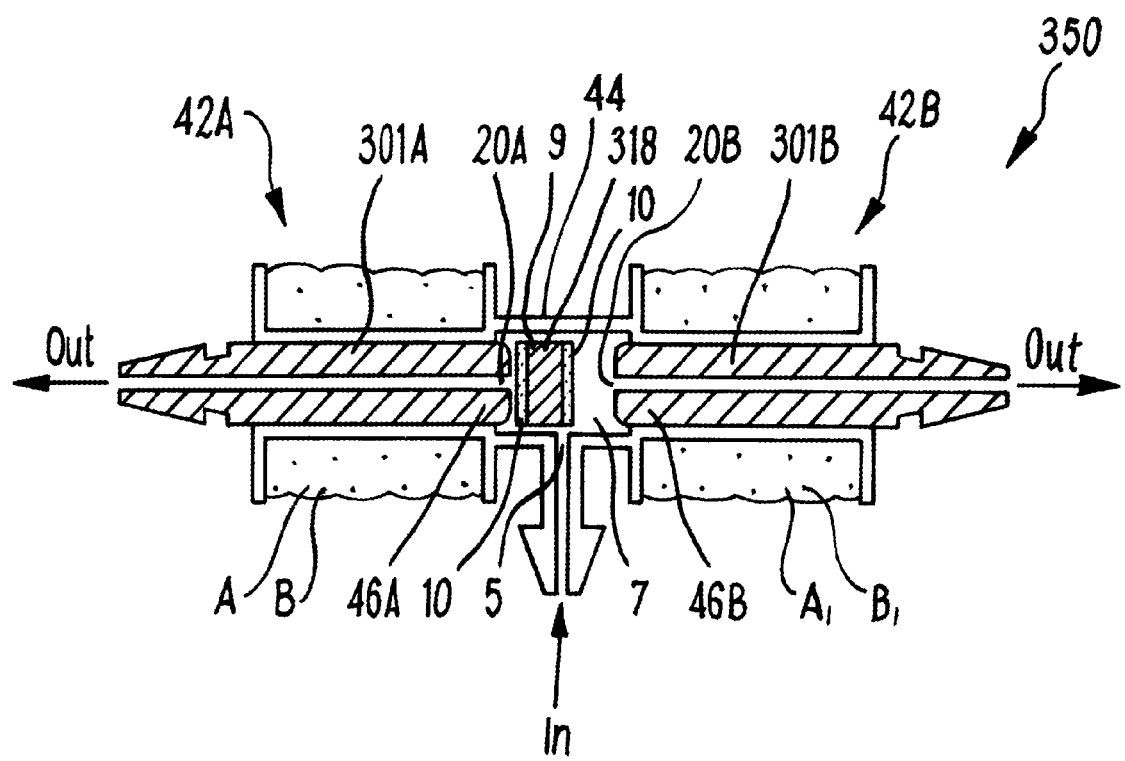

FIGS. 13A, B, C & D are side cross sectional detail views of alternative seating faces;

FIG. 14 is a side cross-sectional view of a third valve arrangement in a closed condition, connected to a fluid communication arrangement;

FIG. 15 is a relatively enlarged side cross-sectional view of a part of the third valve arrangement shown in FIG. 14 in the open condition;

FIG. 15A is a cross-sectional view on arrows B-B in FIG. 15;

FIG. 16 is a diagrammatic view of a centre tapped coil;

FIG. 17 is a side cross-sectional view of a fourth valve arrangement in a first condition, the fourth valve arrangement being an embodiment which is not of the invention.

FIGS. 1 to 6 show an electrically operated fluid flow valve arrangement 50. The arrangement 50 includes an electrically powered magnetic field generator 42, a valve body 44 defining a valve chamber 7, an inlet port 5 and an outlet port 20 and a valve member 18 located in the chamber 7. The valve member 18 is movable between a closed condition in which, in the example shown, the valve member 18 locates against the inlet port 5 to substantially prevent fluid flow therethrough and an open condition in which the valve member 18 permits fluid flow through the inlet port 5. The valve member 18 includes a permanent magnet 9. The arrangement 50 includes a switchable pole 46 formed of a ferromagnetic material.

In use, in the example shown, in a first latched closed condition, the valve member 18 is retained by the switchable pole 46 in the closed condition, and in a second latched open condition, the valve member 18 is in the open condition, the valve member 18 being moved from one latched condition to the other by operation of the generator 42.

The generator 42 is movable between an unpowered condition in which no magnetic field is generated, a first operating condition in which the generator 42 generates a magnetic field in a first direction and a second operating condition in which the generator 42 generates a magnetic field in a second, opposite direction.

In the latched conditions, the generator 42 is in the unpowered condition.

To initiate movement of the valve member 18 between the latched conditions, the generator 42 is moved to either the first operating condition or the second operating condition. Following initiation of the movement, or when the valve member 18 has reached the new latched condition, the generator 42 is moved to the unpowered condition.

In one example, and optimally, the generator 42 only operates to initiate the movement of the valve member 18.

The arrangement 50 includes a ferromagnetic member 1, which comprises, at an end towards the valve chamber 7, the switchable pole 46. The ferromagnetic member 1 defines a passage 16. In the example shown, the passage 16 communicates with the chamber 7 via the inlet port 5, and the ferromagnetic member 1 defines the inlet port 5.

In the example shown, the passage 16 is substantially straight and cylindrical, and the ferromagnetic member 1 is also substantially straight and cylindrical.

The passage 16 has a longitudinal axis 48. The inlet port 5 is substantially circular in shape and has a central axis 52 which is substantially aligned with the passage axis 48. Thus, in this embodiment, both the passage axis 48 and the inlet port axis 52 are associated with the inlet port 5.

The generator 42 comprises a coil 2, which is located around the ferromagnetic member 1. The ferromagnetic member 1 is fixed in position relative to the coil 2.

The arrangement of the coil 2 round the ferromagnetic member 1 has the effect of concentrating and amplifying the magnetic field produced by the coil 2. This helps to increase the efficiency (in terms of power use) of the valve arrangement 50.

The ferromagnetic member 1 could be made of any suitable ferromagnetic material, such as iron, nickel, cobalt or alloys thereof. In one example, the ferromagnetic member 1 is formed of 430FR stainless steel.

The valve body 44 includes a chamber housing 62 which defines the chamber 7.

The valve body 44 includes a coil bobbin 3. Around the bobbin 3 is wound an insulated conductor to form the coil 2, the ends of the conductor being connected to electrical terminals, labelled A and B in the drawings, which are used to pass current through the coil 2. The bobbin 3 extends from and is integral with the chamber housing 62 and comprises a hollow cylindrical part 54 extending between two bobbin flanges 56. The bobbin 3 defines a substantially cylindrical ferromagnetic member receiving passage 58, in which, in an assembled condition, the ferromagnetic member 1 locates. The ferromagnetic member receiving passage 58 communicates with the valve chamber 7.

In the assembled condition, the ferromagnetic member 1 could be a close sliding fit in the ferromagnetic member receiving passage 58. The ferromagnetic member 1 could substantially fill the ferromagnetic member receiving passage 58 and could substantially prevent leakage therealong. In one example, to provide an economical and simple design, the ferromagnetic member 1 is not sealed to the ferromagnetic member receiving passage 58 and a degree of leakage is tolerated. In another example, the ferromagnetic member 1 could be sealed to the cylindrical part 54 to substantially prevent leakage.

The ferromagnetic member 1 comprises a connector 4, to permit connection to a corresponding connector 12 of a fluid communication arrangement 60 comprising, for example, a hose pipe or tubing. In the example shown in FIG. 1, the ferromagnetic member connector 4 is in the form of a barb, and the corresponding connector 12 is comprised by an end of a flexible tube which is push fit over the barb. The connector 4 defines a passage inlet 15 to permit fluid flow from the fluid communication arrangement 60 into the ferromagnetic member passage 16.

In the example shown, the valve body 44 includes an end cap 19 which in the assembled condition locates in an end cap receiving aperture 64 defined by the chamber housing 62. The end cap 19 could be push fit into the aperture 64.

It will be noted that the end cap receiving aperture 64 is substantially the same cross sectional dimension as the chamber 7, which itself is greater than the cross sectional dimension of the ferromagnetic member receiving passage 58, and that the end cap receiving aperture 64, the chamber 7 and the ferromagnetic member receiving passage 58 are all aligned, lying substantially along the same axis, eg the passage axis 48.

These features provide the advantage of easy assembly, as follows.

The coil 2 is wound onto the bobbin 3. The ferromagnetic member 1 is inserted into the ferromagnetic member receiving passage 58. The valve member 18 is located in the chamber 7. The end cap 19 is located in the receiving aperture 64. The valve arrangement 50 is now in the assembled condition.

The various parts could be assembled together in a way which permits disassembly or could be permanently assembled together. For example, the end cap 19 could be fixed into the chamber housing 62 by any convenient means e.g. glue, push fit or, for ease of dismantling, screw threads, or (if one or both parts are of plastics materials) snap fit.

The end cap 19 includes an internal guide surface 66 for guiding the movement of the valve member 18 between the closed condition and the open condition. The guide surface 66 defines the outlet port 20 and includes a first step 28, a second step 29 and between the two steps, a convex part 26 approximately in the form of an arc. The guide surface 66, with the chamber housing 62, defines a valve member receiving recess 68, in which the valve member 18 is receivable in the open condition.

The valve member 18 includes a seal 10, which could be formed of a resiliently deformable material. In the closed condition, the seal 10 extends across the inlet port 5.

The arrangement 50 includes an electrical power supply 72 for providing electrical power to the generator 42. The power supply 72 comprises a power store, which could comprise one or more batteries.

The arrangement 50 includes a switch arrangement 70, for moving the generator 42 between the operating conditions. The switch arrangement 70 could include one or more switches, and could include a timer (not shown).

Figure 1:
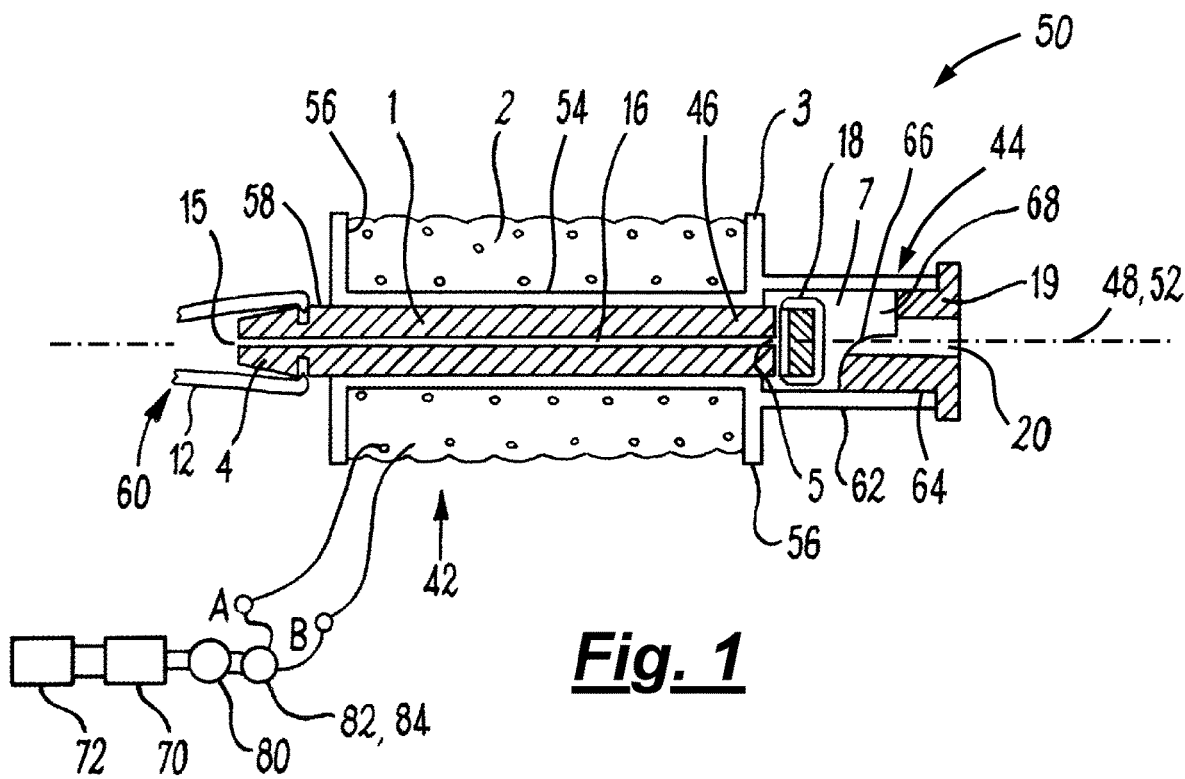
FIG. 1 is a side cross-sectional view of a first valve arrangement in a closed condition, connected to a fluid communication arrangement.
Figure 2:
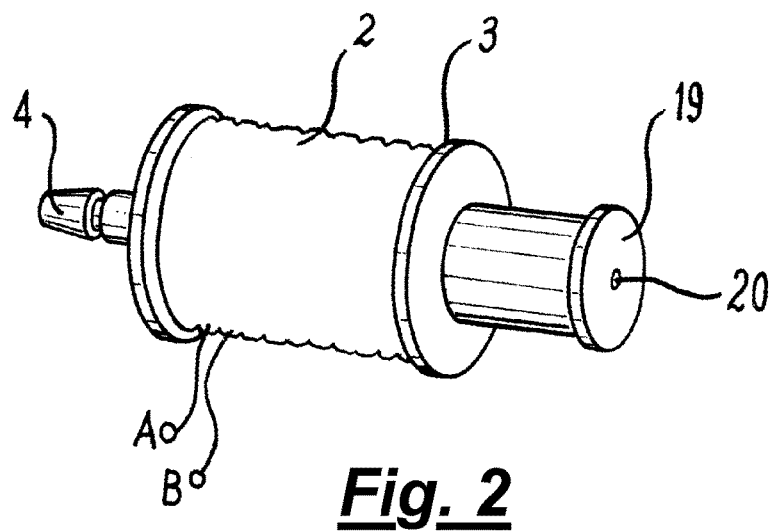
FIG. 2 is a perspective view of the first valve arrangement, not connected to the fluid communication arrangement.
Figure 3:
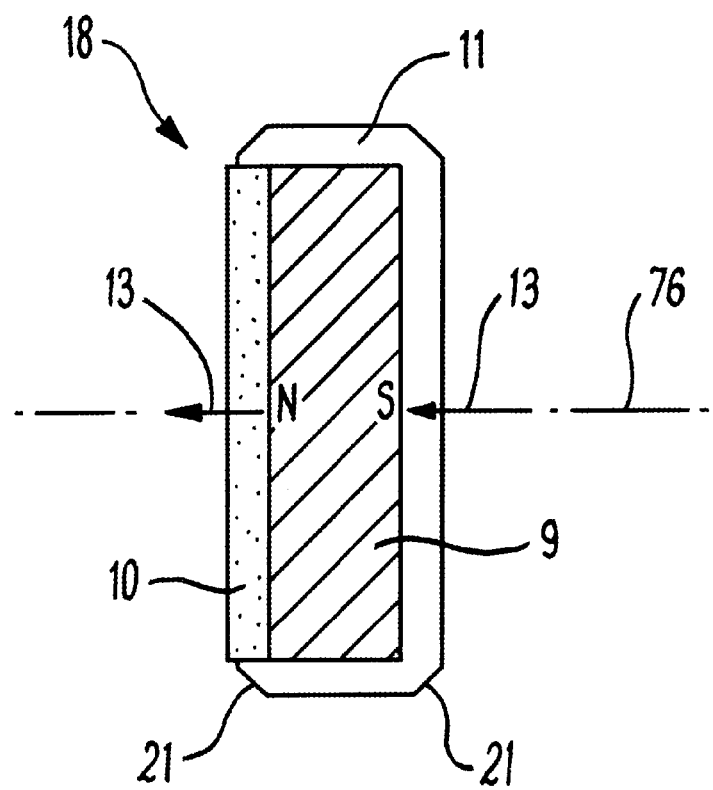
FIG. 3 is a relatively enlarged side cross-sectional view of a valve member of the first valve arrangement.
Figure 3A:
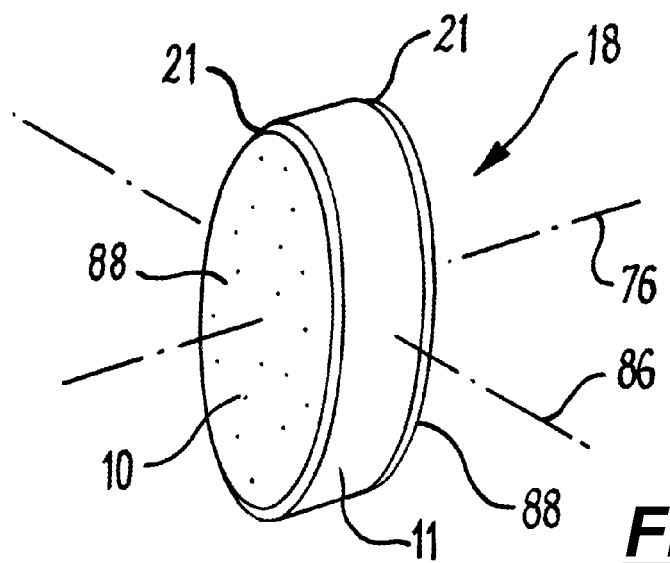
FIG. 3A is a perspective view of the valve member of FIG. 3.

FIGS. 3 and 3A show the valve member 18. In the example shown, the valve member 18 is in the form of a disc or button, being substantially cylindrical with two substantially flat end faces 88. The seal 10 forms one of the substantially flat end faces 88 of the disc. The valve member 18 comprises a housing 11 which extends around the permanent magnet 9 on all sides except the side (or end face) adjacent to the seal 10.

The valve member 18 has an axis 76, which, in this example, is the axis of rotation of the disc-like valve member, which extends longitudinally along the cylindrical valve member 18 and normally (perpendicularly) to the end faces 88.

Also shown in FIG. 3A is an axis 86 which relates to rotational movement of the valve member 18 when moving between the closed and open conditions, which will be described below. The rotational axis 86 shown is for non-limiting illustrative purposes only and is only one of many possible rotational movement axes, which could be located in different positions and orientations relative to the valve member 18. For instance, in one example, the rotational movement axis 76 might not pass through the valve member 18.

The valve member housing 11 has a circular cup like shape and corner relief 21 on its outer edges to help the valve member 18 to clear the interior boundaries of the chamber 7 so that, during valve switchover, the valve member 18 can rotate relatively freely at least to some degree about substantially any axis in the chamber 7.

FIG. 12 illustrates the possible axes of rotation and orthogonal directions of the valve member 18 in the chamber 7. It is a feature of the invention that, in comparison with conventional arrangements, the valve member 18 is relatively free and unconstrained in moving between the open and closed conditions. This reduces mechanical complexity and hence cost.

The seal 10 could be made of a relatively thin sheet of the resiliently deformable material e.g. silicone rubber or thermoplastic elastomer (TPE), and the valve member housing 11 could made from a hard wearing, self-lubricating plastic e.g. acetal. The parts of the valve member 18 could be fixed together with adhesive. The direction of magnetisation of the permanent magnet 9 is axial as shown by the field direction arrows 13 with the letters N and S denoting north and south poles respectively. In the example shown, the seal 10 is adjacent the north pole of the magnet 9.

In use, the permanent magnet 9 is attracted to or repelled by the ferromagnetic member 1. This is utilised as follows in the operation of the valve arrangement 50.

Figure 4:
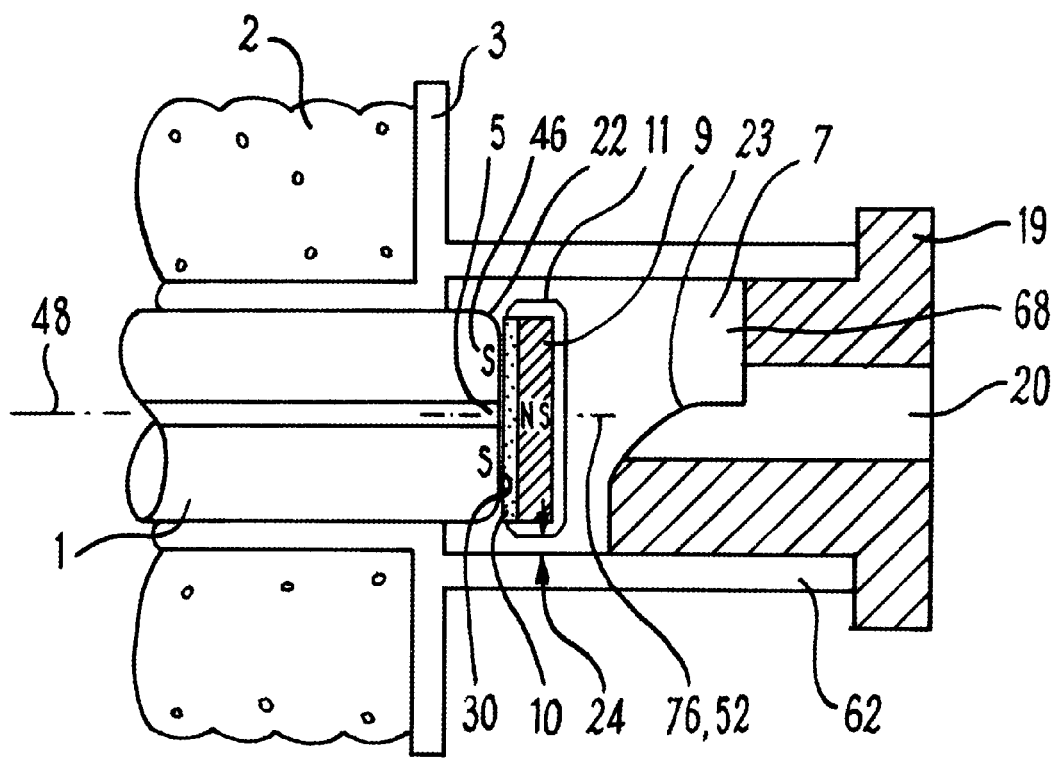
FIG. 4 is a relatively enlarged side cross-sectional view of part of the first valve arrangement in the closed condition.

The valve member 18 is movable between two stable conditions, the first and second latched conditions. The first latched condition, the closed latched condition, is shown in FIG. 4. In this condition, the seal 10 is located against the inlet port 5 and held there by the magnetic attraction between the permanent magnet 9 and the ferromagnetic member 1. In this condition, the switchable pole 46 is temporarily magnetised as a south pole by the proximity of the permanent magnet 9. The generator 42 is in the unpowered condition in which no magnetic field is being generated. The seal 10 prevents fluid flow so that the valve arrangement 50 is effectively closed.

A corner radius 22 on the end of the ferromagnetic member 1 aids assembly and also prevents damage to the seal 10 which might be caused by contact with a sharp edge on the end of the ferromagnetic member 1. The outside diameter of the valve housing 11 and the internal diameter of the chamber housing 62 are chosen to create sufficient clearance 24 to allow the valve member 18 to rotate relatively freely at least to some degree about substantially any axis in the chamber. At the same time the clearance 24 is small enough so that the seal 10 always covers the inlet port 5 when the valve member 18 is in its closed condition even if, due to clearances, the axis 76 of the valve member 18 is not aligned along the passage axis 48 e.g. if the valve member 18 is close to or touching the internal wall of the chamber housing 62.

The valve arrangement 50 will stay indefinitely in the closed latched condition as shown in FIG. 4 until the generator 42 is moved to one of the operating conditions. When the generator 42 is moved to one of the operating conditions (by suitable operation of the switch arrangement 70) a current is passed through the coil 2 of sufficient magnitude and in a direction such that the field induced by the coil 2 in the ferromagnetic member 1 reverses the polarity of the switchable pole 46, so that the switchable pole 46 is in opposition to the field of the permanent magnet 9.

The switchable pole 46 is now a north pole and repels the valve member 18, causing it to move initially substantially linearly away from the ferromagnetic member 1 in the direction of arrow 25 in FIG. 5, substantially along or substantially parallel to the passage axis 48 and the inlet port axis 52. After moving a certain distance, the valve member housing 11 contacts the guide surface 66 at the first step 28, causing the valve member 18 to rotate in the direction of arrow 27 so that the valve member 18 faces in a different direction. The rotational movement of the valve member 18 is around a rotational movement axis (only one example of which is shown in FIG.3A as rotational movement axis 86) which is not aligned with or parallel to the passage axis 48 or the inlet port axis 52.

As will be appreciated, during some or all of the rotational movement, the valve member 18 could also still moving linearly.

In another example, the rotational movement of the valve member 18 describes an arc, for which the rotational movement axis 86 may be relatively remote from the valve member 18.

The convex part 26 encourages rotation of the valve member 18 as shown by arrow 27 into the open condition in the valve member receiving recess 68 as shown in FIG. 6 where further rotation is prevented by the convex part 26 and the interior surface of the chamber housing 62.

In the closed condition, the valve member axis 76 is substantially aligned with or is substantially parallel to the inlet port axis 52. In the open condition, the valve member axis 76 is not substantially aligned with nor substantially parallel to the inlet port axis 52. In one example, the valve member axis 76 in the open condition could be at an angle of between 45° and 120° to the inlet port axis 52. In the example shown, the valve member axis 76 in the open condition is at substantially 90° to the inlet port axis 52.

After initiating movement of the valve member 18, the generator 42 is moved to the unpowered condition.

With the valve member 18 received in the recess 68, the valve arrangement 50 is in its second stable latched condition, the open latched condition. The valve member 18 is held in this open latched condition by the magnetic field of the permanent magnet 9, even after the current through the coil 2 is switched off and the generator 42 is in the unpowered condition. This is because the position of both north and south poles of the permanent magnet 9 relative to the switchable pole 46, create a short magnetic circuit, allowing flux to flow from north pole to south pole directly through the switchable pole 46, holding the valve member 18 in position after the generator 42 is moved to the unpowered condition.

In the open latched condition, the valve member 18 is prevented from "flipping" over and back into contact with the ferromagnetic member 1 in a reversed orientation by the valve member receiving recess 68.

The valve arrangement 50 stays in the open latched condition indefinitely or until the generator 42 is moved to the other of the operating conditions. When the generator 42 is moved to the other of the operating conditions (by suitable operation of the switch arrangement 70), a second current pulse of opposite polarity and of sufficient magnitude is passed through the coil 2. Reversing the voltage reverses the direction of the current through the coil 2 and hence the direction of the magnetic field induced in the ferromagnetic member 1, reversing again the polarity of the switchable pole 46.

The reversed polarity of the ferromagnetic member 1 now attracts the valve member 18 back to the closed latched condition, against the ferromagnetic member 1, with the seal 10 closing the inlet port 5.

Advantageously, only a relatively short operating time period of the generator 42 is required to cause the movement from one latched condition to the other. The valve arrangement 50 of the invention thus provides economical and energy saving operation, which is particularly important in applications where only limited power is available, such as battery power.

Advantageously, the arrangement 50 does not require fluid pressure or biasing means (such as a spring) to maintain either of the latched conditions.

The applicant has found that only a short duration pulse is required to switch the valve arrangement of the invention between the latched conditions, for example, 0.1 seconds.

In use, the switch arrangement 70 could be triggered by some external agent, eg a timer or a sensor.

Figure 11:
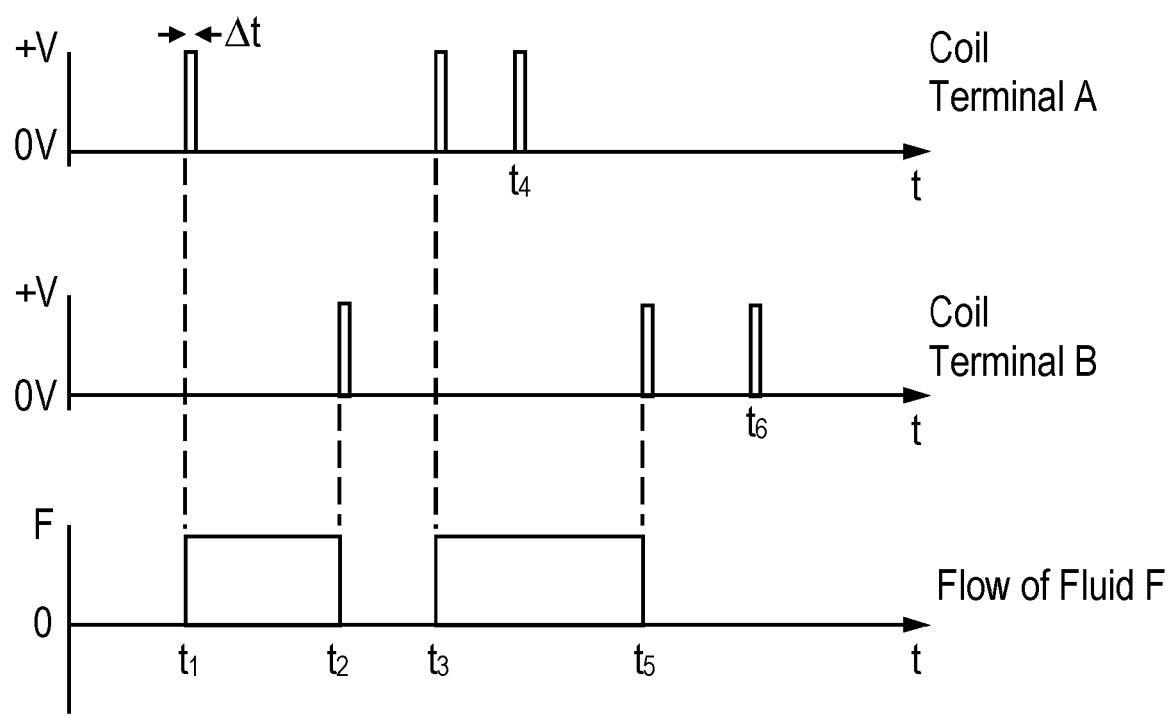
FIG. 11 is a graph of an energisation sequence of an electrically powered magnetic field generator for moving the valve member between the open and closed conditions.

FIG. 11 illustrates, by way of time synchronised graphs, how voltage pulses applied to the coil terminals A and B over a period of time t control the fluid flow F through the valve arrangement 50 of the invention.

Initially, at time t=0, the valve member 18 is in its closed latched condition. The valve arrangement 50 is closed and therefore flow F through the valve arrangement 50 is zero.

At time t1, the coil terminal A is connected to positive voltage +V for a period of time Δt while coil terminal B is connected to zero volts creating a first current pulse which has the effect of moving the valve member 18 to its open latched condition, opening the valve arrangement 50. The fluid flow rises to a non-zero value F.

The valve arrangement 50 then stays open until time t2. At time t2, the coil terminal B is connected to positive voltage +V for a period of time Δt while coil terminal A is connected to zero volts creating a second current pulse of opposite direction to the first current pulse, which has the effect of moving the valve member 18 back to its closed latched condition, closing the valve arrangement 50. Consequently the fluid flow F reduces to zero and stays at zero until time t3.

At time t3, the first current pulse is repeated opening the valve arrangement 50 and allowing flow F.

It will be noted that another repetition of the first current pulse at time t4 has no effect on the valve arrangement 50 since the current is flowing in the wrong direction to close the valve arrangement 50.

The valve arrangement 50 stays open in the open latched condition until a repetition of the second current pulse at time t5 closes it. Likewise a further repetition of the second current pulse at time t6 has no effect as the current is flowing in the wrong direction to open the valve arrangement 50.

Other arrangements for producing a reversible magnetic field in the ferromagnetic member 1 could be utilised. For example, the generator 42 could comprise a centre-tapped coil 102 as shown in FIG. 16. In this case the centre tap C of the coil 102 could remain earthed and when the end terminals A & B of the coil 102 are connected to a suitable voltage source they produce magnetic field in opposing directions.

It will be seen that when the valve arrangement 50 is in its open latched condition, the fluid path through the valve body 44 is substantially straight and uninterrupted as shown by the arrow 40 in FIG. 6. This helps minimise fluid pressure loss to maximise the usability of the valve arrangement 50. For example, if the fluid pressure at the passage inlet 15 is sufficient, a fluid jet will be created which could issue from the inlet port 5 straight out of the valve body 44 through the outlet port 20 in the end cap 19. This is advantageous for distributing the fluid to its desired position, for example, in the watering of plants.

It is an advantage of the invention that the valve member 18 is completely contained within the valve chamber 7 and there is no mechanical connection to the valve member 18, simplifying construction and simplifying maintenance.

In one example, the arrangement 50 could include a power supply monitor 80, the function of which is to trigger an alarm if the voltage or power available from the power supply 72 reduces below a desirable level. The arrangement 50 includes a power supply status indicator 84, which comprises an oscillator 82, which can be triggered by the power supply monitor 80 so that the generator 42 generates an oscillating magnetic field in one, each or either operating condition. In a status indication condition, the oscillator 82 causes audible vibration of the valve member 18 relative to the switchable pole 46. In one example, in the closed condition, the oscillator 82 causes audible vibration of the valve member 18 against the ferromagnetic member 1 when the generator 42 operates to move the arrangement 50 from the closed condition to the open condition.

This is advantageous in, for example, a plant watering situation, where an indicator lamp might be easily hidden beneath foliage. When the battery power reduces past the desirable level, the noise caused by the vibration of the valve member 18 against the ferromagnetic member 1 provides an audible warning signal of low battery power.

In one example, the oscillator 82 produced a square wave of 310 Hz which gave a relatively loud audible vibration in the closed condition when the generator 42 operated to move the arrangement 50 from the closed condition to the open condition.

The arrangement 50 includes a seating face 30 against which the valve member 18 locates in the closed condition. The seating face 30 defines the inlet port 5. In the embodiment shown in FIGS. 1 to 6, the seating face 30 is formed by an end face of the ferromagnetic member 1. As most clearly seen in FIG. 5, the seating face 30 in this embodiment is substantially flat, and projects somewhat beyond the ferromagnetic member receiving passage 58 into the chamber 7. This ensures good sealing contact between the seal 10 of the valve member 18 and the seating face 30.

The seating face 30 could be a different shape from that shown in FIGS. 1 to 6. FIGS. 13A, B, C & D show some (non-exhaustive) examples of possible shapes of the seating face 30.

Figure 13D:
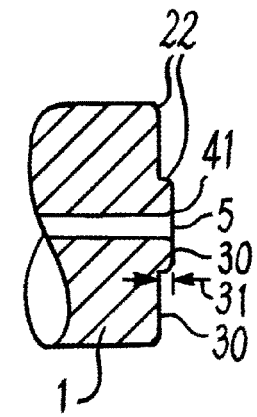

FIG. 13A shows a flat seating face 30 as is shown in FIGS. 1 to 6. The shapes of the seating face 30 in FIGS. 13B, 13C and 13D are respectively convexly curved, conical and stepped. Each shape is drawn exaggerated for clarity of the drawings, but, in fact, the distance 31 by which they deviate from a flat face as in FIG. 13A need only be in the order of 0.05 mm to 0.5 mm to gain benefit. The shapes of the seating faces 30 in FIGS. 13B, 13C & 13D all provide the benefit of increasing the operating pressure of the valve since they increase the sealing interface pressure between the seal 10 and the seating face 30 around the inlet port 5 without significantly increasing the gap between the ferromagnetic member 1 and the permanent magnet 9 because that would reduce the magnetic attractive force.

It is also advantageous for the seating face 30 to be polished in order to promote a fluid tight seal against the seal 10, to have radii 22 on external corners and to break the sharp corner on the edge of the inlet port 5 with a small chamfer or radius 41 to prevent damage to the seal 10 when the valve closes.

The applicant has found that the attractive force on the valve member 18 when the valve member is in the closed condition will depend on at least: the strength of the permanent magnet 9, the thickness of the seal 10, the magnetic properties, e.g. permeability, of the ferromagnetic member 1 and the shape of the seating face 30. Furthermore, the applicant has found that the ability of the valve member 18 to remain in the closed condition against fluid pressure at the inlet port 5 depends chiefly on the magnetic attractive force on the valve member 18 and the cross sectional area of the inlet port 5, according to the following proportional relationship:

Maximum valve operating pressure α magnetic attractive closing force/inlet port area For example, the valve operating pressure can be increased by increasing the strength of magnet 9 or by reducing the area of inlet port 5. Likewise, the higher the magnetic attractive closing force, the greater the current flow required through the coil 2 to oppose the magnetic attractive force to cause the valve member 18 to move away from its closed latched condition towards its open latched condition.

FIGS. 7 to 10, 14, 15 and 17 show other embodiments of the invention, many features of which are similar to those already described in relation to the embodiment of FIGS. 1 to 6. Therefore, for the sake of brevity, the following embodiments will only be described in so far as they differ from the embodiment already described. Where features are the same or similar, the same reference numerals have been used and the features will not be described again.

FIGS. 7 to 10 show part of a second valve arrangement 150. In this embodiment, the arrangement does not include a guide surface as such—the internal surface of the end cap 19 is flat. Also, as shown most clearly in FIG. 10, the second valve arrangement 150 includes a valve member 118 which includes a housing 111 which defines a bypass flow channel 32. In this example, the bypass flow channel 32 is in the form of a diametric slot 32 bounded by two side walls 33, 34 and of a depth 35, which in the open condition permits fluid flow therethrough. In other respects the valve member 118 is similar to that of the previous embodiment, comprising the housing 111 which houses a permanent magnet 9 which is faced by a seal 10.

The slot 32 is preferably deep enough to expose the back of the magnet 9.

Figure 7:
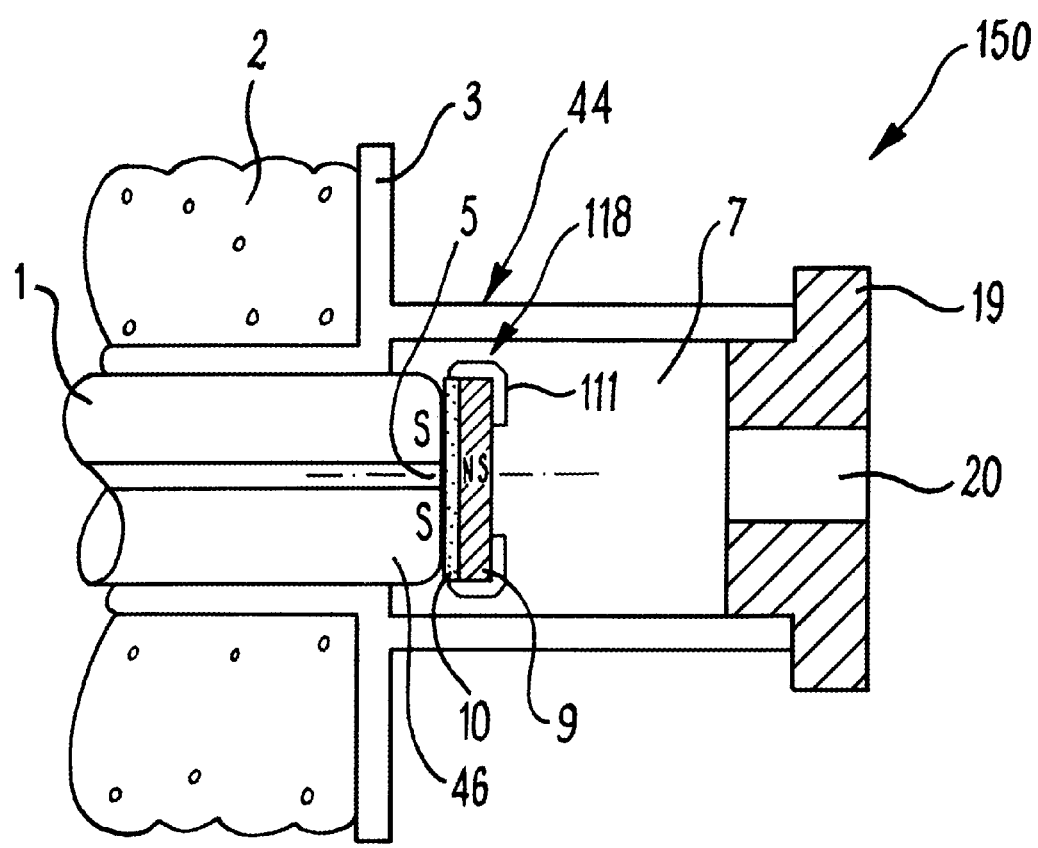
FIG. 7 is a side cross-sectional view of a part of a second valve arrangement in the closed condition.

As in the first embodiment, the valve member 118 has two stable positions. FIG. 7 shows the valve arrangement 150 in a closed latched condition. As previously, in this condition, the permanent magnet 9 is attracted to the ferromagnetic member 1, the seal 10 closes the inlet port 5 and the generator 42 is in the unpowered condition.

The generator 42 is moved to a first operating condition which causes a current to pass through the coil 2 of sufficient magnitude and in a direction such that the field induced by the coil 2 in the ferromagnetic member 1 reverses the polarity of the switchable pole 46, so that the magnetic field in the switchable pole 46 is in opposition to the field of the permanent magnet 9.

The switchable pole 46 is now a north pole and repels the valve member 118 away from the ferromagnetic member 1.

As in the previous embodiment, initially the valve member 118 moves substantially linearly away from the inlet port 5, and then rotates.

Figure 8:
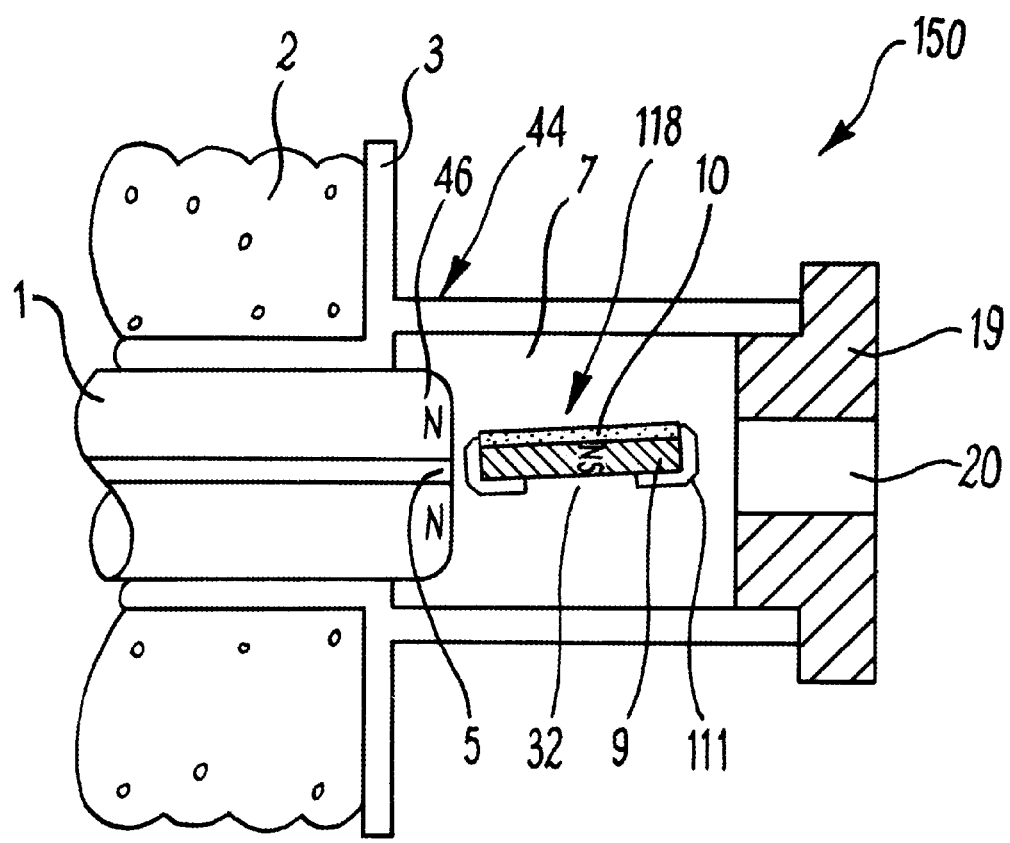
FIG. 8 is a side cross-sectional view of the part of the second valve arrangement shown in FIG. 7 in transition from the closed to an open condition.

In this embodiment, there is nothing to prevent the valve member 118 freely rotating around any of the axes shown in FIG. 12 in the chamber 7. The valve member 118 rotates in the chamber 7 so that its orientation and field direction is reversed relative to the switchable pole 46. The south pole of the magnet 9 of the valve member 118 is now attracted to the switchable pole 46 of the ferromagnetic member 1. FIG. 8 shows the valve member 118 part way through this rotation.

In the example shown, the movement between the open and closed conditions could include any of the movements shown in FIG. 12, within the constraints of the chamber 7.

Figure 9:
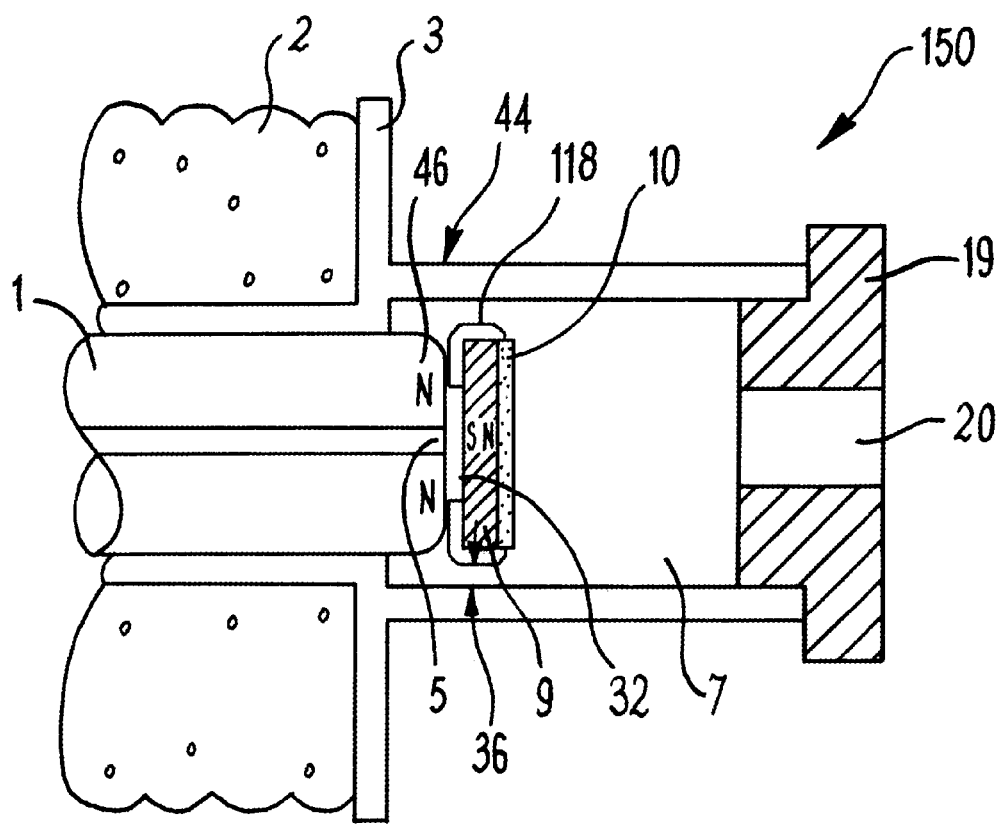
FIG. 9 is a side cross-sectional view of the part of the second valve arrangement shown in FIGS. 7 and 8 in the open condition.
Figure 10:
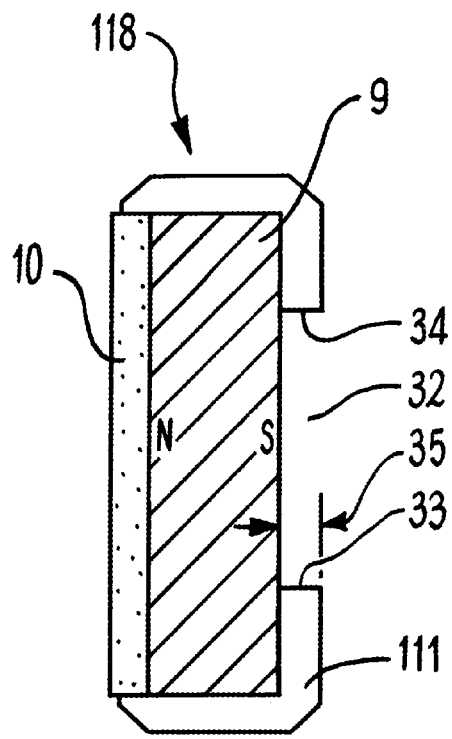
FIG. 10 is a relatively enlarged side cross sectional view of a valve member of the second valve arrangement.
Figure 10A:
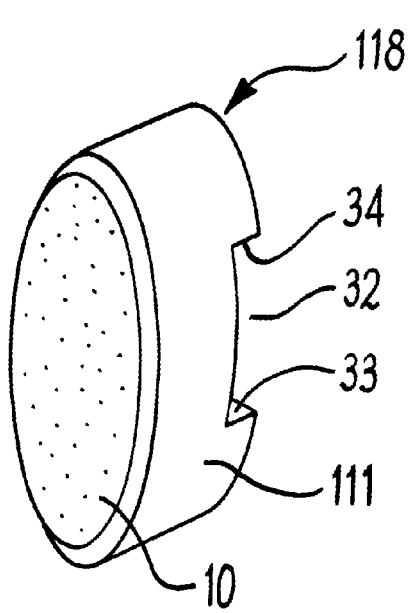
FIGS. 10A & 10B are perspective views from the front and rear respectively of the valve member of FIG. 10.
Figure 10B:
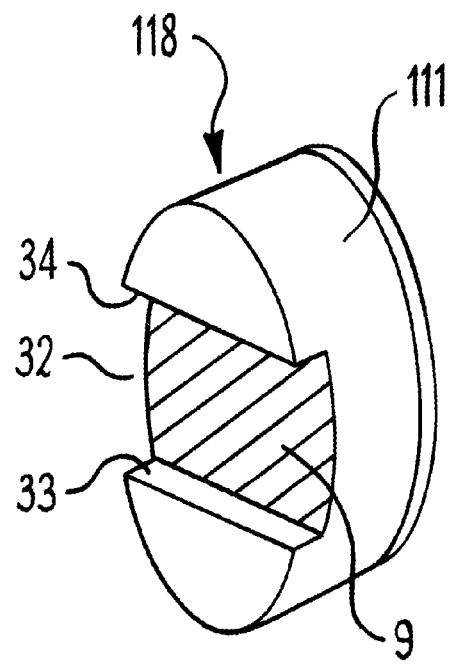

When this rotation is complete the valve member 118 comes to rest in its second stable position, the open latched condition, as shown in FIG. 9, with the valve member 118 held against the ferromagnetic member 1 by the magnetic attraction between the magnet 9 and the switchable pole 46. In the open latched condition, the slot 32 now communicates with the inlet port 5, permitting fluid flow therethrough, into the chamber 7 and out of the outlet port 20 in the end cap 19. As shown in FIG. 9 the width of the slot 32 is relatively large compared with the clearance 36 between the outside diameter of the valve member 118 and the internal diameter of the chamber 7 so that the slot 32 will always straddle the inlet port 5 when the valve arrangement 150 is in its open condition even if, due to clearances, the valve member 118 is not resting central to the ferromagnetic member 1 and the inlet port 5 e.g. if it is close to or touching the internal wall of the chamber 7.

Thus, in moving between the open condition and the closed condition in this embodiment, the valve member 118 rotates through substantially 180° so that it faces in an opposite direction.

The energisation requirements and energisation sequence of this second embodiment of the invention are the same as for the first embodiment.

FIGS. 14 and 15 show a third valve arrangement 250, which is the same as the arrangement of the first embodiment, except that the arrangement includes a second I 39, which assists movement of the valve member 18 between the latched conditions and retention of the valve member 18 in the respective latched condition.

The arrangement 250 includes a second ferromagnetic member 37. The second ferromagnetic member 37 includes the second switchable pole 39. The second ferromagnetic member 37 is in the form of an elongate strip formed of a ferromagnetic material which extends from a region at or towards the inlet end of the ferromagnetic member 1, over the coil bobbin 3 and is bent inwardly to lie alongside and on one side of the chamber housing 62, adjacent the valve member receiving recess 68, as shown in FIG. 15A. The part which lies alongside the chamber housing 62 comprises the second switchable magnetic pole 39.

In one example, the second ferromagnetic member 37 is a piece of sheet metal with three bends in it and incorporating a hole 38 which fits snugly over the fluid inlet end of the ferromagnetic member 1 for efficient coupling of magnetic field between the two.

In use, the ferromagnetic member 1 and the second ferromagnetic member 37 effectively form a single magnetic material, with the second switchable pole 39 being of opposite polarity to the switchable pole 46. This has been found to considerably improve the operation of the valve arrangement 250.

In use, when moving from the closed latched condition to the open latched condition, the valve member 18 is both repelled by the switchable pole 46 and attracted by the second switchable pole 39.

When moving from the open latched condition to the closed latched condition, the generator 42 operates to reverse the polarities of both switchable poles 46, 39. The valve member 18 is then both attracted by the switchable pole 46 and repelled by the second switchable pole 39.

The second switchable pole 39 provides a more efficient path for the magnetic field produced by the coil 2 and increases the magnetic field strength between the second switchable pole 39 and the switchable pole 46 of the ferromagnetic member 1. One beneficial effect of the second ferromagnetic member 37 is to increase the effectiveness of the solenoid coil 2 so that the valve arrangement 18 can be switched between the latched conditions with lower current. Another beneficial effect of the second ferromagnetic member 37 is that when the valve arrangement 18 is in its open latched condition as shown in FIG. 15, the proximity of the second switchable pole 39 to the magnet 9, attracts the magnet 9 increasing the stability of the valve member 18 in the open latched condition, when the coil 2 is not energised.

To achieve these beneficial effects, the position of the second switchable pole 39 around the circumference of the valve body 44 is important. The second switchable pole 39 should be lined up with the second step 29 of the end cap 19 so that the second switchable pole 39 is as close as possible to, and ideally, parallel to, the face of the magnet 9 when the valve member 18 is in its open latched condition.

The second ferromagnetic member 37 need not be formed from sheet material. Other types of material and methods of manufacture e.g. sintering or machining from solid material could be used. The second switchable pole 39 is shown as flat but could advantageously be curved to fit the outside shape of the chamber 7 reducing the effective gap and increasing the strength of the magnetic field.

In one example, the applicant has used the following components:

a commercially available permanent magnet 9 of 6 mm diameter, thickness 1 mm, made from Grade N35 neodymium iron boron material:

a seal 10 of 0.5 mm thick silicone rubber;

a ferromagnetic member 1 of 6 mm diameter made from 430FR magnetic stainless steel, with the seating face 30 having a shape shown in FIG. 13C and an inlet port 5 having a diameter of 0.5 mm.

With these components, the valve arrangement had a maximum operating fluid pressure of approximately 1.5 bar. In this case, it was also found that using a coil of approximately 8 mm inside diameter, 21 mm outside diameter, 14 mm long made up of approximately 800 turns of 0.25 mm diameter enamelled copper wire, the coil current pulse required to switch the valve member between states was 0.8 amps for a duration of 0.1 seconds. In this example the outside diameter of the valve member 18 was 7 mm and the inside diameter of the chamber was 8 mm giving a radial clearance 24 of 0.5 mm. These details are given by way of example only.

FIG. 17 shows a fourth valve arrangement 350, which includes two generators 42A, 42B on a valve body 44 defining a valve chamber 7, an inlet port 5 and opposed first and second outlet ports 20A, 20B.

The arrangement 350 includes first and second switchable poles 46A, 46B formed of a ferromagnetic material, each of which defines one of the outlet ports 20A, 20B respectively.

The valve member 318 comprises a permanent magnet 9 with a seal 10 on each side. Once again, in this embodiment, the direction of magnetisation of the permanent magnet 9 is axial.

In use, in a first latched condition, the valve member 318 is retained by the first switchable pole 46A in the closed condition against the first outlet port 20A. In this condition, fluid can flow through the inlet port 5 into the chamber 7 and out through the second outlet port 20B.

In a second latched condition, the valve member 18 is retained by the second switchable pole 46B in the closed condition against the second outlet port 20B. In this condition, fluid can flow through the inlet port 5 into the chamber 7 and out through the first outlet port 20A.

The valve arrangement 350 is moved between the latched conditions by simultaneous or alternating operation of the generators 42A, 42B for a relatively short period of time. Operation of the generators 42A, 42B causes the valve member 318 to shuttle between the outlet ports 20A, 20B.

Thus, in this embodiment, the valve arrangement 350 provides a diverter valve or three port changeover valve.

Various other modifications could be made without departing from the scope of the invention. The arrangement and the various components thereof could be of any suitable size and shape, and could be formed of any suitable material.

It is an advantage of the invention that the fluid flow could be reversed through the valve arrangements, so that those ports which are described as inlet ports become outlet ports and vice versa. This is because the maintenance of the latching conditions is not reliant on the direction of the fluid flow.

The fluid could be liquid or gas.

The polarities of the magnet 9 and switchable pole(s) could be reversed from that shown.

It will be appreciated that although the passage 16 is shown in the drawings as having the same diameter throughout its length, it could be advantageous to vary the diameter of the passage 16 along its length. For example, the passage 16 could have a relatively small diameter at the inlet port 5 but a relatively larger diameter away from the inlet port 5.

This arrangement would aid manufacture since small diameter holes can be slow and difficult to manufacture. Widening the diameter of the passage 16 away from the inlet port 5 also reduces pressure drop along the passage 16, increasing the usability of the valve arrangement 50, but does not affect the operating pressure of the valve arrangement.

The valve member 18 could be constructed differently. It could be of any suitable size and shape and could be formed of any suitable material or combination of materials. In one example, the valve member 18 could be formed without the seal 10 and the valve member housing 11, so that the valve member 18 comprises the permanent magnet 9 only. This has been found to give a fluid tight seal if the sealing surfaces are smooth and such an approach is advantageous for lower cost applications, possibly where opening and closing of the valve arrangement 50 is expected to be infrequent.

In another example, the valve member 18 could comprise the magnet 9 coated in a suitable material coating such as a layer of plastics or elastomer material on one or more sides.

It will be appreciated that although the embodiments described here by way of example show valves in which the fluid transported flows freely out of the outlet port 20, or holes, in the end cap 19, it is also possible within the scope of the invention for a fluid connection means to be added to the end cap 19 and suitable sealing, e.g. O-rings, added between the ferromagnetic member 1 and the bobbin 3 and between the end cap 19 and the chamber 7 to create a valve with fluid connection e.g. tube connection at the output as well as the input.

It will also be appreciated that for long life and reliable operation, the components of the valve arrangement which come into contact with the fluid being transported should preferably be resistant to attack from that fluid. By way of example, if the fluid being transported is water then suitable materials could be plastics materials for the valve body and valve housing and magnetic stainless steel for the ferromagnetic member. Silicone rubber could be utilised for the seal and the permanent magnet could be nickel plated and optimally gold plated.

It will also be appreciated that although the valve arrangements of the invention are suitable for use in plant watering systems, they may also find advantageous use in other applications, including but not limited to; a fire sprinkler, atomiser, pressure vent valve, gas sampling valve.

Any of the features or steps of any of the embodiments shown or described could be combined in any suitable way, within the scope of the overall disclosure of this document.

There is thus provided an electrically operated fluid flow valve arrangement with a number of advantages over conventional valve arrangements. The present arrangement is simple in construction and economical to manufacture and maintain. It requires power only to move the arrangement between latching conditions which is particularly advantageous where power is limited. The flow direction is reversible. The valve member is completely contained within the valve chamber and there is no mechanical connection to the valve member, simplifying construction and making it easy to remove, clean or replace the valve member if necessary for maintenance purposes.

The invention claimed is:

1. An electrically operated fluid flow valve arrangement, the arrangement including:
an electrically powered magnetic field generator;
a valve body defining a valve chamber, an inlet port and an outlet port;
a valve member located in the valve chamber and movable between a closed condition in which the valve member locates against one of the ports to prevent fluid flow through said one of the ports and an open condition in which the valve member permits fluid flow through said one of the ports; and
a ferromagnetic member having a first switchable pole; and the arrangement being such that:
the valve member includes a permanent magnet;
the first switchable pole is formed of a ferromagnetic material;
the ferromagnetic member defines a passage which communicates with the valve chamber via said one of the ports;
in use, in a first latched condition, the valve member is retained by magnetic attraction to the first switchable pole in one of the closed or open conditions;
in use, in a second latched condition, the valve member is retained by magnetic attraction to the first switchable pole in the other of the closed or open conditions;
in the first and second latched conditions, the generator is in an unpowered condition; and
the valve member is movable from one latched condition to the other by operation of the generator.

2. An arrangement according to claim 1 in which movement of the valve member between the open and the closed conditions includes rotational movement.

3. An arrangement according to claim 2 in which the arrangement includes an axis associated with said one of the ports, and in which the rotational movement is around an axis which is not aligned with or parallel to the axis associated with said one of the ports.

4. An arrangement according to claim 1 in which movement of the valve member between the open and the closed conditions includes linear movement.

5. An arrangement according to claim 1 in which the operation of the generator reverses the polarity of the first switchable pole.

6. An arrangement according to claim 1 in which the generator is movable between an unpowered condition wherein no magnetic field is generated, a first operating condition wherein the generator generates a magnetic field in a first direction, and a second operating condition wherein the generator generates a magnetic field in a second and opposite direction, and in which to initiate movement of the valve member between the said first and second latched conditions, the generator is moved to either the first operating condition or the second operating condition.

7. An arrangement according to claim 1 in which the ferromagnetic member defines said one of the ports.

8. An arrangement according to claim 1 in which the generator comprises a coil which is located around the ferromagnetic member.

9. An arrangement according to claim 1 in which the valve body includes a guide surface for guiding movement of the valve member between the closed condition and the open condition.

10. An arrangement according to claim 9 in which the guide surface includes a convex part.

11. An arrangement according to claim 1 in which the valve member defines one or more bypass flow channels, which in the open condition permit fluid flow through said one or more bypass flow channels.

12. An arrangement according to claim 1 in which the arrangement includes a second switchable pole, which assists movement of the valve member between the said first and second latched conditions and retention of the valve member in the respective latched condition.

13. An arrangement according to claim 12 in which the second switchable pole is of opposite polarity to the first switchable pole.

\* \* \* \* \*